United States Patent [19]

Williams

[11] Patent Number: 4,662,394

[45] Date of Patent: May 5, 1987

[54] TIGHT SHUT-OFF VALVE WITH FLOW CONTROL ELEMENT

[75] Inventor: Kenneth R. Williams, Huntington Beach, Calif.

[73] Assignee: Johnston Pump/General Valve, Inc., Glendora, Calif.

[21] Appl. No.: 880,750

[22] Filed: Jun. 30, 1986

Related U.S. Application Data

[63] Continuation-in-part of Ser. No. 791,589, Oct. 25, 1985, abandoned.

[51] Int. Cl.$^4$ .............................................. F16K 11/14
[52] U.S. Cl. ........................... 137/614.11; 137/614.17; 137/630.21; 251/113
[58] Field of Search ....................... 137/614.11, 614.16, 137/614.17, 630, 630.14, 630.2, 630.21; 251/113

[56] References Cited

U.S. PATENT DOCUMENTS

| | | | |
|---|---|---|---|
| 1,620,464 | 3/1927 | Huff | 137/630.21 |
| 2,809,662 | 10/1957 | Ray | 137/614.17 |
| 2,944,568 | 7/1960 | Jonson | 137/614.11 X |
| 2,997,057 | 8/1961 | Toth | 137/614.11 X |
| 3,430,658 | 3/1969 | Self | 137/614.11 X |
| 3,526,249 | 9/1970 | Baustrair | 137/614.11 |
| 3,860,032 | 1/1975 | Rogers | 137/614.17 |
| 4,230,154 | 10/1980 | Kalbfeisch | 137/614.17 |

FOREIGN PATENT DOCUMENTS

| | | | |
|---|---|---|---|
| 432615 | 12/1911 | France | 137/614.17 |
| 1216989 | 12/1970 | United Kingdom | 137/614.17 |

Primary Examiner—A. Michael Chambers
Assistant Examiner—John C. Fox
Attorney, Agent, or Firm—Leonard Tachner

[57] ABSTRACT

A flow control apparatus for use primarily in plug-type and ball-type valves provides means for continuously varying the flow rate of fluid through the valve while using the same operator that is used to control the open and closed position of the valve. The upper trunnion is integrally connected to a butterfly member and connected to the plug by a mechanical linkage comprising a latch rod and a roller latch with corresponding detents in the valve body and upper trunnion, respectively. The butterfly member controls the fluid flow with the plug in the open position in response to 90 degrees of overtravel in the same operator that controls the position of the plug.

12 Claims, 8 Drawing Figures

TIGHT SHUT-OFF VALVE WITH FLOW CONTROL ELEMENT

CROSS-REFERENCE TO RELATED APPLICATION

This application is a continuation-in-part of patent application Ser. No. 791,589 filed Oct. 25, 1985 now abandoned.

BACKGROUND OF THE INVENTION

Field of the Invention

The present invention relates generally to tight shut-off valves such as plug valves or ball valves and more specifically, to such valves which also have a flow control element mounted in the waterway of the plug valve or the ball valve to provide a flow control capability for modulating flow in the opened position of the valve.

Prior Art

Typically, conventional plug valves or ball valves provide a tight shut-off capability designed either to prevent total flow through the valve in one configuration or provide for 100% of flow through the valve in the other configuration. By way of example, one such valve is disclosed in U.S. Pat. No. 3,011,513 which describes a twin seal plug valve capable of double block and bleed performance. Such a prior art valve is designed to completely shut-off the flow of fluid through the valve when the passageway through the plug is oriented at 90 degrees with respect to the connecting inlet and outlet pipes. Furthermore, such prior art valves are designed to permit 100% flow through the valve when the plug passage is oriented coaxially with the inlet and outlet pipes. Such valves are not designed to provide a means for controlling the flow rate of the fluid through the valve in the open position whereby the flow of fluid through the valve is in the range between the closed and fully opened position such as where the fluid flow rate would be for example only 50% of the maximum flow rate capability of the valve.

There is prior art which discloses means for controlling the flow rate of a plug-type or ball-type valve so that the maximum flow rate can be limited to be less than the capability of the valve in its fully opened position. However, there does not appear to be any prior art which permits such control in a continuously variable configuration which allows simple and expedient changes in the flow rate through the valve element using the operator that would normally be used to control the open and close position of the valve. By way of example, U.S. Pat. No. 2,140,292 to Jensen discloses means for providing a fixed maximum flow regulating orifice that is concentric with the main shut-off plug. However, Jensen does not provide for continuous modulation of the secondary control element by the common valve operator after the main shut-off plug has reached the full open position. Similarly, U.S. Pat. No. 3,526,249 to Baustian discloses a control valve which has an adjustable "preset" maximum opening but again does not disclose a continuously variable secondary element within the main blocking plug directly operable by means of the same main operator that controls the opened and closed position of the plug itself. Thus, although the prior art provides various valve designs which permit a form of flow control in a plug or ball-type valve, the relatively fixed configuration of each such flow control scheme still leaves a substantial need for a valve design which permits convenient and readily accessible flow control variation in such a valve using the same operator that the user would otherwise employ to open and close the valve in its conventional configuration.

SUMMARY OF THE INVENTION

The present invention provides means for operating a flow control element such as a butterfly member that is mounted in the waterway of a plug or a ball valve by means of a roller latch between the upper trunnion and the plug to maintain a fixed relationship between the plug and the trunnion during normal turning of the element and then to subsequently allow rotary motion between the plug and the trunnion in an overtravel of ¼ turn. The overtravel provides a means for modulating a variable open position of the flow control element with respect to the plug waterway, the flow control element being directly attached to the upper trunnion. The resultant valve provides a flow control valve element concentrically within a tight shut-off plug or ball-type valve wherein the control valve portion may be operated with no modification to the rotary valve operators with the exception of insuring that there is an additional 90 degrees or other required rotary travel of the rotary operator to modulate the flow control element in the overtravel position. The invention thus provides an added unique capability for continuous flow variation control in the open position of the valve with little or no change in the external configuration of the valve and with a simple low-cost but yet elegant improvement implemented entirely within the interior of the valve thereby giving the user an additional capability at relatively trivial additional cost.

OBJECTS OF THE INVENTION

It is therefore a principal object of the present invention to provide a flow control valve concentrically within a tight shut-off plug or ball-valve which control valve portion may be operated with no modification to rotary valve operators with the exception on insuring that there is an additional 90 degrees or other required rotary travel of the rotary operators to modulate the flow control element in the overtravel position.

It is an additional object of the present invention to provide a tight shut-off valve of the type having a plug or ball therein for opening and/or closing the valve to the flow of fluid therethrough and which valve comprises an improvement consisting of a flow control element mounted in the waterway of the plug or ball valve element to permit continuous flow control variation of the valve in its open position.

It is still an additional object of the present invention to provide an improved plug or ball valve having a flow control element such as a butterfly mounted in the waterway of the plug or ball element by means of a roller latch between the upper trunnion and the plug or ball to maintain a fixed relationship between the plug or ball and the trunnion during the normal ¼ turn and then to allow rotary motion between the plug and the trunnion is an overtravel extension of the ¼ turn for the purpose of modulating a variable open position of the flow control element with respect to the plug waterway, the flow control element being directly attached to the upper trunnion.

It is still an additional object of the present invention to provide a combined flow control and double block and bleed valve in which the flow control portion of the invention is provided for permitting the user to continuously vary the fluid flow rate through the valve in its open position without requiring any substantial modification to the external configuration of the valve or to the rotary valve operator associated with the valve.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the accompanying drawings in which:

FIGS. 3, 3a and 3b is a cross-sectional view through the plug portion of a valve of the present invention illustrating the manner in which the control valve portion thereof may be selectively latched and unlatched to permit rotation of the butterfly member improvement of the invention both dependently and independently of the plug.

DETAILED DESCRIPTION OF A PREFERRED EMBODIMENT

Figure 1:
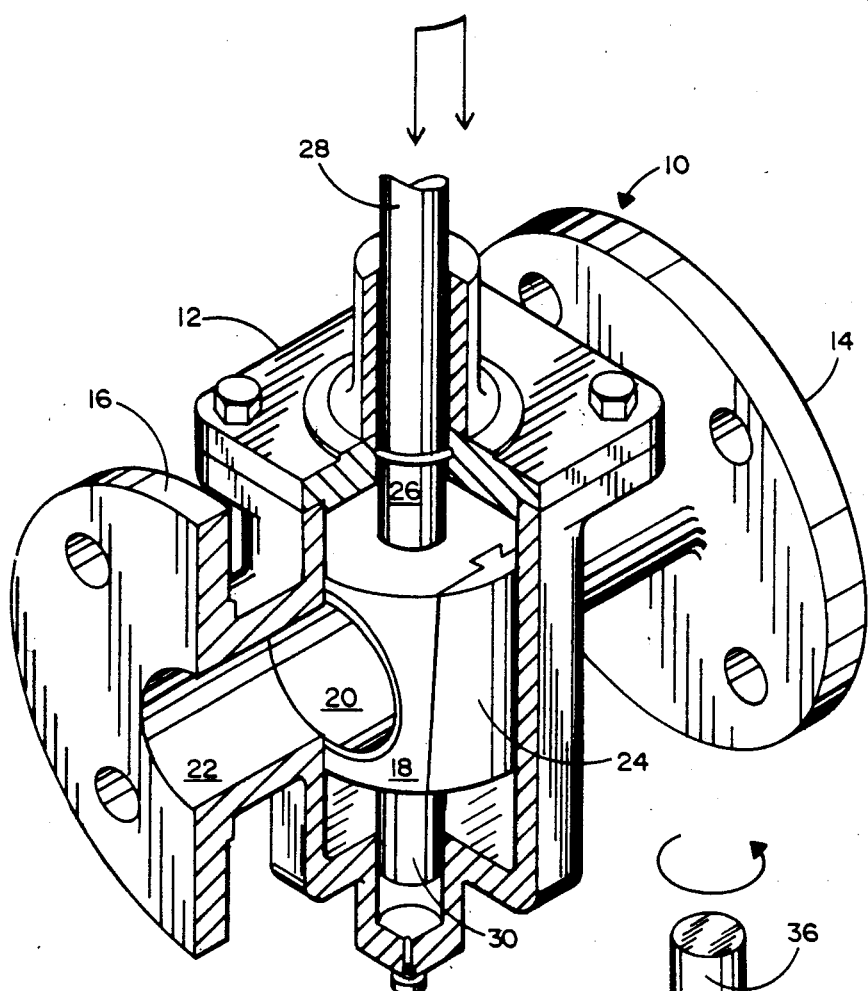
FIG. 1 is an isometric view of a prior art plug valve shown without the improvement of the present invention.

Referring first to FIG. 1 it will be seen that a typical plug valve 10 of the prior art comprises a valve body 12 having an inlet 14 and an outlet 16. The valve body 12 encloses a plug 18 through which there is a flow passage 20 which is designed to mate with inlet and outlet passages 22 when the valve is configured in its open configuration as shown in FIG. 1. Plug 18 may by way of example, be configured to operate in conjunction with a pair of slips 24 which enable low friction rotation of the plug within the valve body and also provide for a double block and bleed capability when the valve is in its closed position. Plug 18 is positioned within the valve body 12 for rotation therein coaxially with an upper trunnion 26 and a lower trunnion 30. Upper trunnion 26 is typically connected to a valve stem 28 which is in turn connected to the operator mechanism (not shown) which is provided for either manual or automated operation of the valve between its open and closed configurations.

One significant limitation of the prior art valve of FIG. 1 is that it is designed to operate in either a closed or open mode and it is not configured to operate in a flow control mode wherein there is flow but less than the maximum flow capacity of the valve.

Figure 2:
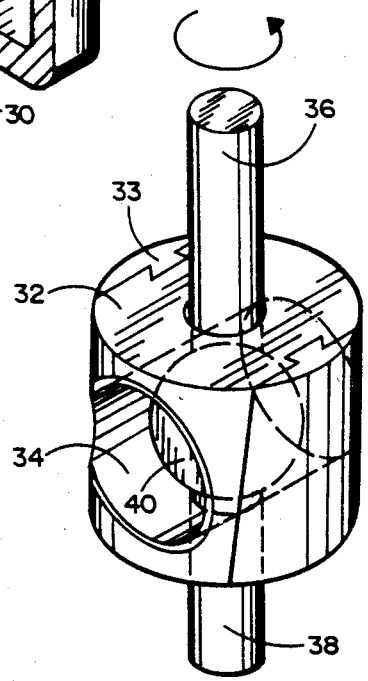
FIG. 2 is an isometric view of the prior art plug portion of the plug valve of FIG. 1 but modified with the improved control element of the present invention.

The present invention is a highly significant and advantageous improvement on valves of the type shown in FIG. 1 in which the capability for flow control in the open position of the valve is provided with a minimum of structural modification to the valve and in which the flow control capability provided by the invention is one of continuously variable control in which the user can readily obtain virtually any flow rate he wishes between zero and maximum using the same operator he would otherwise use to open and close the valve. Thus, the improved plug 32 of FIG. 2 also includes slips 33 and a flow passage 34 and is also designed to be interfaced with the valve body by means of an upper trunnion 36 and a lower trunnion 38. However, plug 32 also includes a novel butterfly valve 40 which is positioned within the passage 34 and which is adapted to rotate about the axis of the trunnions 36 and 38 whereby to permit selective control over the effective aperture of passage 34 depending upon the relative position of butterfly valve 40 within the passage. Thus for example, in the view provided by FIG. 2, the butterfly valve 40 is positioned at approximately 45 degrees with respect to the axis of flow passage 34 thereby to permit the flow of fluid through the valve but at a substantially reduced rate as compared to the maximum flow rate of the plug passage without the butterfly or with the butterfly in a fully open position. The details of the butterfly valve interface with the conventional elements of the valve of FIG. 1 along with its operational sequence will now be discussed in conjunction with FIGS. 3 and 4.

Figure 3:
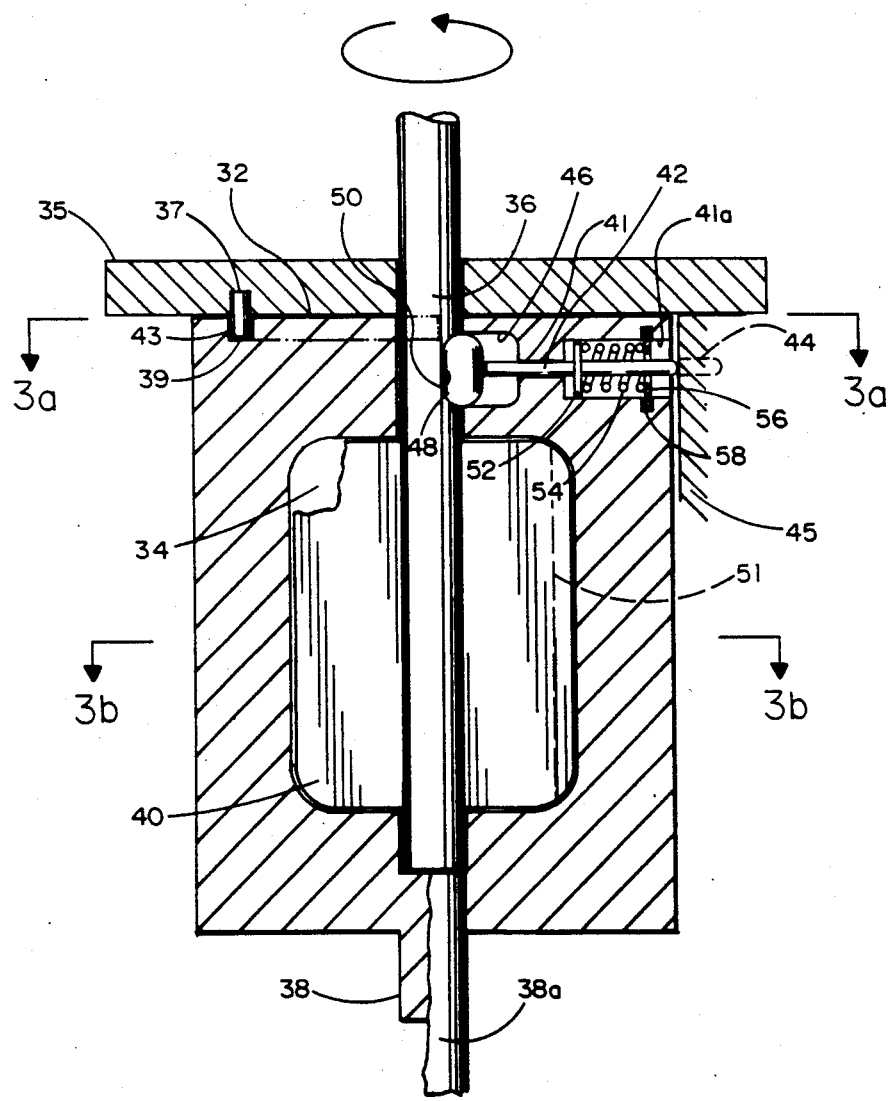
FIG. 3 comprising

Referring to FIG. 3 it will be seen that the plug 32, butterfly 40 and flow passage 34 are shown in a rectangular configuration for purposes of illustrating that the present invention may be implemented in a variety of different geometrical shapes to accommodate the conventional configurations of most plug valves and ball valves. Furthermore, as illustrated at the bottom-most portion of FIG. 3, the lower trunnion of the valve of the present invention may be of the conventional configuration as illustrated by trunnion 38 or of the inverted trunnion configuration as illustrated by trunnion 38a. In either case, the upper trunnion 36 is detached from the plug 32 and passes through the flow passage 34 which is occupied by the substantially congruent butterfly valve 40 which is integral to the upper trunnion 36 within the passage. Plug 32 is provided with a channel 41 in which there is positioned a latch rod 42 for slideable repositioning therein. The valve body 45 adjacent the channel 41 is provided with a body detent 44 which is adapted to receive one end of the latch rod 42. The area of plug 42 immediately adjacent the upper trunnion 36 is provided with a latch chamber 46 in which there is positioned a roller latch 48 which is adapted to be received by a trunnion detent 50 in upper trunnion 36.

During conventional operation of the plug 32, latch rod 42 is not aligned with body detent 44 and therefore, rod 42 is in a position to force roller latch 48 into the trunnion detent 50. In this configuration, upper trunnion 36 and plug 32 rotate as an integral unit and as a result, rotation by the operator of the valve rotates the plug in a conventional manner. However, when latch rod 42 is aligned with body detent 44 the rod is forced into the detent thereby releasing the roller latch 48 from the trunnion detent 50. This action frees the upper trunnion 36 from its linkage to the plug 32 thereby allowing upper trunnion 36 and integral butterfly valve 40 to rotate independently of plug 32. It is in this configuration that the flow control portion of the present invention comes into play, permitting the user to vary the flow rate depending upon the angle of the butterfly valve 40 relative to the axis of the flow passage 34.

Thus, in the view provided by FIG. 3 the latch rod 42 is substantially aligned with body detent 44. This would occur after the plug has been rotated so that flow channel 34 has been aligned with the corresponding flow channels of the inlet and outlet as will be seen hereinafter. Pending further rotation of the upper trunnion 36 in this configuration, butterfly valve 40 is substantially perpendicular to flow channel 44 thereby continuing to substantially block the flow through the plug 32. However, further counterclockwise rotation of upper trunnion 36 as shown in FIG. 3 releases the roller latch 48 from the trunnion detent 50 as previously described thereby permitting rotation of just the butterfly valve 40 for permitting controlled increase in the flow rate through the flow passage 34. Channel 41 may preferably be enlarged in diameter at 41a to permit use of a bias spring 54 to force latch rod 42 out of body detent 44 as soon as roller latch 48 engages detent 50. Spring 54 is retained between a ring 52 on rod 42 and a washer 56, the latter being retained in an annular recess 58.

Figure 3A:
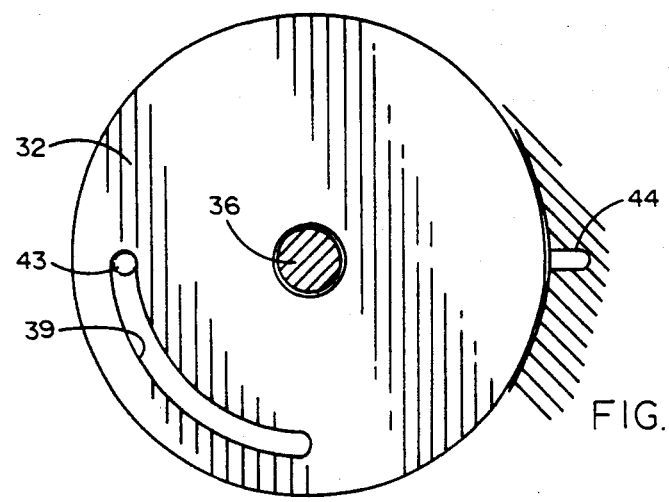
Figure 3B:
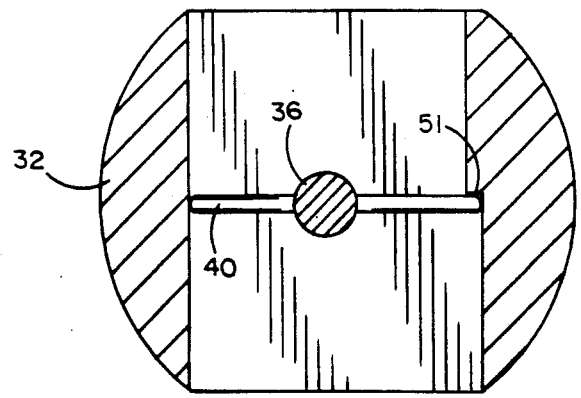

The present invention preferably includes structure shown in FIGS. 3, 3a and 3b designed to ensure that valve 40 and plug 32 move either together or independently during opening and closing as required during each portion of the respective cycles. More specifically, as seen in FIGS. 3 and 3a, a valve bonnet 35 overlies plug 32 and is provided with a pin 43 extending downwardly from a recess 37. Plug 32 is provided with an arcuate groove 39 of approximately 90 degrees arch and adapted to receive pin 43. In this manner, when the plug 32 and valve 40 have been rotated together to the point where flow channel 34 is properly positioned for flow therethrough, the interaction of pin 43 and groove 39 prevents further rotation of the plug 32 while permitting further rotation of valve 40.

Similarly, flow channel 34 in plug 32 is provided with a shoulder 51 shown in FIG. 3b and designed to engage an edge of valve 40. Accordingly, when the valve is rotated to block flow channel 34 during closing, the valve engages the shoulder 51 whereby further rotation of trunnion 36 must thereafter rotate both the valve 40 and plug 32 in unison. The action of the valve of the present invention in conjunction with the butterfly portion thereof will now be described in more detail in conjunction with FIGS. 4a through 4c.

Figure 4A:
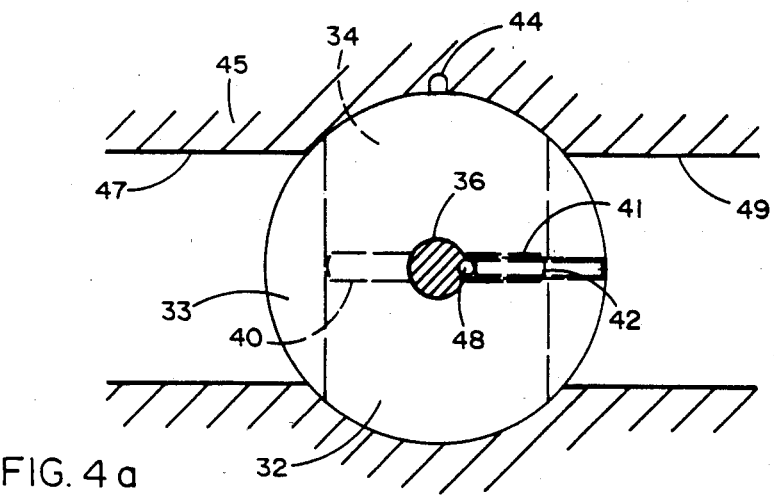
FIG. 4 comprising FIGS. 4a, 4b and 4c provide sequential top views of the plug and control valve portion of the present invention illustrating the operational sequence thereof for placing the valve in the opened position with a selected degree of flow therethrough.
Figure 4B:
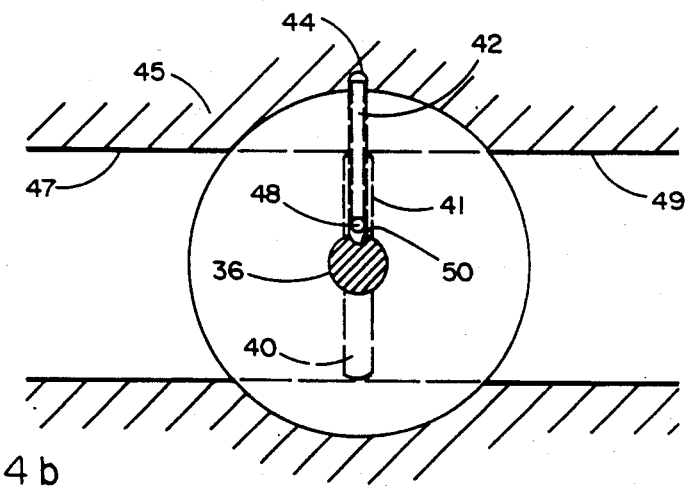
Figure 4C:
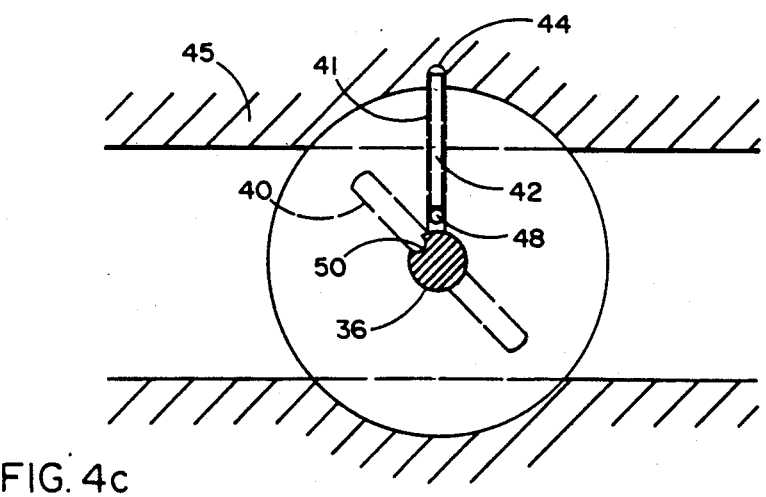

More specifically, referring now to FIGS. 4a, 4b and 4c it will be seen that in the configuration of the invention shown in FIG. 4a, the plug 32 is in its closed configuration with flow passage 34 oriented substantially perpendicular to the inlet passage 47 and outlet passage 49. In this configuration, slips 33 are positioned in facing relation to passages 47 and 49 thereby providing a double block configuration preventing flow through the valve and allowing maintenance personnel to bleed the valve if desired for maintenance purposes. As further seen in FIG. 4a, in the closed configuration of the valve, latch rod 42 is entirely contained within the plug 32 thereby forcing roller latch 48 into the trunnion detent 50 of upper trunnion 36. In this configuration, as previously described in conjunction with FIG. 3, the upper trunnion 36 and the remaining portions of plug 32 are in effect integrated by the mechanical interconnection through roller latch 48 and therefore rotational force imparted to upper trunnion 36 by means of the valve operator will cause the entire plug 32 to rotate. Furthermore, as seen in FIG. 4a, butterfly valve 40 is aligned with the channel 41 coaxially with the flow axis of inlet 47 and outlet 49.

Upon counterclockwise rotation of upper trunnion 36 through a 90 degree angle, the valve configuration becomes that represented by FIG. 4b. More specifically, as seen in FIG. 4b, plug 32 has now been rotated 90 degrees whereby flow channel 34 is aligned with the inlet 47 and the outlet 49. Under normal conditions for conventional prior art plug and ball valves, the configuration of FIG. 4b would permit maximum fluid flow through the valve. However, the present invention is configured whereby butterfly valve 40 is now aligned perpendicularly with respect to the inlet 47 and the outlet 49 thereby substantially blocking all flow through the valve. The configuration of FIG. 4b is substantially that of FIG. 3 previously described wherein latch rod 42 and channel 41 are now aligned with body detent 40 adjacent plug 32. In this configuration as previously described in conjunction with FIG. 3, latch rod 42 is free to enter detent 44 thereby releasing roller latch 48 from trunnion detent 50 and disengaging the upper trunnion 36 from the remaining portions of the plug 42. However, the butterfly valve 40, being integral to the upper trunnion 36, is still free to rotate with rotation of the upper trunnion and this is precisely what occurs next as shown in FIG. 4c.

More specifically, as seen in FIG. 4c, upper trunnion 36 has now been rotated approximately 45 degrees counterclockwise beyond the rotational position of FIG. 4b. Because of the interaction between latch rod 42 and body detent 44, plug 32 has remained fixed during the further rotation of upper trunnion 36. However, the butterfly valve 40, being affixed to upper trunnion 36, has rotated through the same angle of approximately 45 degrees thereby permitting a selected limited fluid flow through the flow passage 34 of plug 32 while still preventing maximum flow. Clearly, further counterclockwise rotation of upper trunnion 36 until the trunnion has been rotated an additional 90 degrees counterclockwise from the position shown in FIG. 4b, would place the butterfly valve in a position substantially parallel to the flow axis through inlet 47 and outlet 49 as well as flow passage 34 thereby permitting substantially maximum flow of the fluid through the plug 32.

When the valve is to be closed the sequence illustrated in FIGS. 4a, 4b and 4c is reversed and the upper trunnion 36 is caused to rotate in a clockwise direction thereby first reorienting butterfly valve 40 in a position substantially perpendicular to the flow axis through the valve until the valve reassumes the configuration shown in FIG. 4b. At this point, further rotation of upper trunnion 36 in a clockwise direction will cause latch rod 42 to be released from body detent 44 thereby causing the latch rod 42 to move towards the upper trunnion 36 and causing the roller latch 48 to again engage the trunnion detent 50 within upper trunnion 36. Further clockwise rotation of upper trunnion 36 causes the plug 32 to also rotate in the same direction until the plug reassumes its closed configuration of FIG. 4a. Because of the interaction of valve 40 and shoulder 51 as described above in conjunction with FIG. 3b, valve 40 and plug 32 are thereafter interlocked and detent 50 and latch cannot force rod 42 back toward body detent 44 during the remainder of the closing cycle after the valve 40 is rotated to the position of FIG. 4b.

Those having skill in the art to which the present invention pertains will understand that in addition to the rotational motion of upper trunnion 36 described in conjunction with FIGS. 3 and 4, there may be vertical movement thereof in association with the interaction between the plug 32 and the slips 33. Such vertical motion of trunnion 36 may for example be of the type shown in the upper-most portion of FIG. 1 for a seat and reseat valve in which a plug moves upwardly for rotation and again downwardly for being reseated in its open position. On the other hand, it may be of the type wherein the plug moves only upwardly into the open position for rotation or downwardly into the closed position subsequent to rotation in the opposite direction. In either case, it will be understood that the operator with which the present invention may be used would be of conventional design with regard to the vertical motion and conventional rotational motion of upper trunnion 36, and need only be provided with the added capability of the overtravel of 90 degrees beyond the opened position of the plug whereby to control the position of butterfly valve 40.

It will now be understood that what has been disclosed herein comprises a novel flow control element for a plug-type or ball-type valve which permits continuous control of the flow rate of the fluid through such valves while utilizing the same operating mechanism that is conventionally used for controlling the open and closed position of the valve. The flow control portion of the invention comprises a butterfly valve that is made integral to the upper trunnion. The upper trunnion is affixed to the plug by means of a mechanical linkage comprising a latch rod and roller latch during the opening and closing of the plug of the valve in a conventional manner. However, the upper trunnion is mechanically disengaged from the plug during the overtravel portion of the operation of the valve whereby to control the position of the butterfly valve relative to the plug passageway for continuously varying the level of flow through the passageway while the plug is in its open position.

Those having skill in the art to which the present invention pertains will, as a result of the applicant's teaching herein, now perceive of various additions and modifications which may be made to the invention. By way of example, other butterfly valve geometries and shapes as well as alternative means for engaging and disengaging the upper trunnion with the plug will now occur to those who have had the benefit of the applicant's teaching herein. However all such modifications and additions are deemed to be within the scope of the invention which is to be limited only by the claims appended hereto.

I claim:

1. A control valve apparatus for use in a valve of the type having a rotatable member such as a plug and a flow passage in the member for selectively opening and closing the valve depending upon the position of the plug relative to the surrounding valve body, the position of the plug being dependent upon the rotational position of a trunnion connected to an operator; the apparatus comprising:
   a butterfly valve integral with said trunnion and substantially congruent to said flow passage; and
   mechanical linking means for connecting said trunnion to said member for rotating said member and for disconnecting said trunnion from said member and connecting said member to said valve body for rotating said butterfly valve independently of said member;
   whereby when said trunnion is rotated by said operator for opening said valve, first said member is rotated for aligning said passage with the flow of fluid therethrough and second said butterfly valve is rotated within said flow passage for controlling the rate of fluid therethrough.

2. The apparatus recited in claim 1 wherein said mechanical linking means comprises a latch rod, a roller latch, a detent in said trunnion for receiving said roller latch, a channel within said member for receiving said latch rod and a detent in said valve body adjacent said channel for receiving one end of said latch rod.

3. The apparatus recited in claim 2 wherein said latch rod, said roller latch, said channel and said detents are all arranged along a common axis substantially perpendicular to said trunnion.

4. The apparatus recited in claim 3 wherein said latch rod is longer than said channel.

5. The apparatus recited in claim 4 wherein said roller latch is within said trunnion detent during rotation of said member and is outside of said trunnion detent during rotation of said trunnion and said butterfly valve independently of said member.

6. The apparatus recited in claim 5 wherein said latch rod is outside of said body detent during rotation of said member and is partially within said body detent during rotation of said trunnion and said butterfly valve independently of said member.

7. An improved plug-type valve of the type having a rotatable plug including a flow passage for selectively opening and closing the valve depending on the position of the plug relative to the surrounding valve body, the position of the plug being dependent on the rotational position of a trunnion connected to an operator; the improvement comprising:
   a butterfly member integral with said trunnion and substantially congruent to said flow passage; and
   mechanical linking means for connecting said trunnion to said plug for rotating said plug and for disconnecting said trunnion from said plug and connecting said plug to said valve body for rotating said butterfly member independently of said plug;
   whereby when said trunnion is rotated by said operator for opening said valve, first said plug is rotated for aligning said passage with the flow of fluid therethrough and second said butterfly member is rotated within said flow passage for controlling the rate of fluid therethrough.

8. The apparatus recited in claim 7 wherein said mechanical linking means comprises a latch rod, a roller latch, a detent in said trunnion for receiving said roller latch, a channel within said member for receiving said latch rod and a detent in said valve body adjacent said channel for receiving one end of said latch rod.

9. The apparatus recited in claim 8 wherein said latch rod, said roller latch, said channel and said detents are well arranged along a common axis substantially perpendicular to said trunnion.

10. The apparatus recited in claim 9 wherein said latch rod is longer than said channel.

11. The apparatus recited in claim 10 wherein said roller latch is within said trunnion detent during rotation of said plug and is outside of said trunnion detent during rotation of said trunnion and said butterfly member independently of said plug.

12. The apparatus recited in claim 11 wherein said latch rod is outside of said body detent during rotation of said plug and is partially within said body detent during rotation of said trunnion and said butterfly member independently of said plug.

* * * * *